(12) United States Patent
Woo et al.

(10) Patent No.: US 12,340,321 B2
(45) Date of Patent: Jun. 24, 2025

(54) ELECTRONIC DEVICE, SERVER AND METHOD FOR PROVIDING A PERSONAL MOBILITY SERVICE OF A SERVER

(71) Applicants: Hyundai Motor Company, Seoul (KR); Kia Corporation, Seoul (KR)

(72) Inventors: Jae Yul Woo, Seoul (KR); Soobin Kim, Seoul (KR); Seunghyun Woo, Seoul (KR); Rowoon An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 778 days.

(21) Appl. No.: 17/502,886

(22) Filed: Oct. 15, 2021

(65) Prior Publication Data
US 2022/0156650 A1  May 19, 2022

(30) Foreign Application Priority Data
Nov. 13, 2020  (KR) .......... 10-2020-0151861

(51) Int. Cl.
*G06Q 30/0283*  (2023.01)
*B60R 25/24*  (2013.01)
(Continued)

(52) U.S. Cl.
CPC ............. *G06Q 10/02* (2013.01); *B60R 25/24* (2013.01); *G06Q 30/0284* (2013.01);
(Continued)

(58) Field of Classification Search
CPC ..... H04W 4/025; H04W 12/06; H04W 88/02; G07F 17/0057; G07F 15/005; G07F 15/003; G07C 9/00571; G07C 9/22; G07C 9/27; G07C 9/32; G07C 9/38; G06Q 10/02; G06Q 30/0266; G06Q 30/0284; G06Q 50/40; G06Q 10/00; G06Q 20/145; G06Q 20/3224; G06Q 30/0269; G06Q 30/0645; G06Q 50/06; G06Q 30/0207; G06Q 30/0261; G06Q 30/04; G06Q 30/06; B60R 25/24;
(Continued)

(56) References Cited

U.S. PATENT DOCUMENTS

2019/0196470 A1* 6/2019 Kaneko ............. G06Q 30/0269
2021/0001744 A1* 1/2021 Suzuki .................... B60L 53/65
(Continued)

*Primary Examiner* — Dionne Pendleton
(74) *Attorney, Agent, or Firm* — Slater Matsil, LLP

(57) ABSTRACT

An embodiment server includes a communication device, a memory configured to store information about personal mobility vehicles and user information about users, and a control device electrically connected to the communication device and the memory, the control device being configured to receive a first authentication request of a first user of an electronic device from the electronic device through the communication device, receive an authentication request of a first personal mobility vehicle of the plurality of personal mobility vehicles from the first personal mobility vehicle through the communication device, authenticate the first authentication request of the first user, authenticate the authentication request of the first personal mobility vehicle, and transmit unlock information of the first personal mobility vehicle to the first personal mobility vehicle through the communication device based on both authentications.

20 Claims, 9 Drawing Sheets

(51) Int. Cl.
*G06Q 10/02* (2012.01)
*G06Q 50/40* (2024.01)
*G07C 9/00* (2020.01)
*G07C 9/22* (2020.01)
*G07C 9/27* (2020.01)
*G07C 9/32* (2020.01)
*G07C 9/38* (2020.01)
*G07F 17/00* (2006.01)
*G06Q 30/0645* (2023.01)

(52) U.S. Cl.
CPC ......... *G06Q 50/40* (2024.01); *G07C 9/00571* (2013.01); *G07C 9/22* (2020.01); *G07C 9/27* (2020.01); *G07C 9/32* (2020.01); *G07C 9/38* (2020.01); *G07F 17/0057* (2013.01); *G06Q 30/0645* (2013.01)

(58) Field of Classification Search
CPC ...... B60L 53/65; B60L 53/66; B60L 2250/12; B60L 2250/14; B60L 2250/20; B60L 50/50; B60L 53/126; B60L 53/53; B60L 53/62; B60L 53/665; B60L 53/67; B60L 53/68; B60L 53/80; B60L 55/00; B60L 58/16; B60L 2200/12; B60L 2240/72; B60L 2270/36; B60L 50/20; B60L 53/12; B60L 53/14; B60L 53/30; B60L 53/38; B60L 53/55; B60L 53/63; B60L 53/64; Y02T 10/70; Y02T 90/167; Y02T 10/7072; Y02T 90/12; Y02T 90/14; Y02T 90/16; Y02T 10/72; Y04S 30/14; Y04S 10/126; Y04S 50/10; Y04S 50/12; B60H 1/00357; B60H 1/00742; G05D 1/0088; G05D 1/021; G05D 1/0212; G06F 16/22; G06F 16/24575; G06F 16/252; H02J 7/00; H04L 63/0823; H04L 63/0846; Y02E 60/00; Y02E 60/10; G08G 1/205; B60W 2050/0095; B60W 2556/50; B60W 60/0021; B60W 60/00253; B62H 2003/005; B62H 3/02; G01C 21/3415; H01M 10/441

See application file for complete search history.

(56) References Cited

U.S. PATENT DOCUMENTS

| | | | |
|---|---|---|---|
| 2021/0136543 A1* | 5/2021 | Hannestad | H04W 4/023 |
| 2023/0241986 A1* | 8/2023 | Saal | B60L 53/12 320/108 |
| 2024/0152980 A1* | 5/2024 | Borras | G06Q 30/0284 |

* cited by examiner

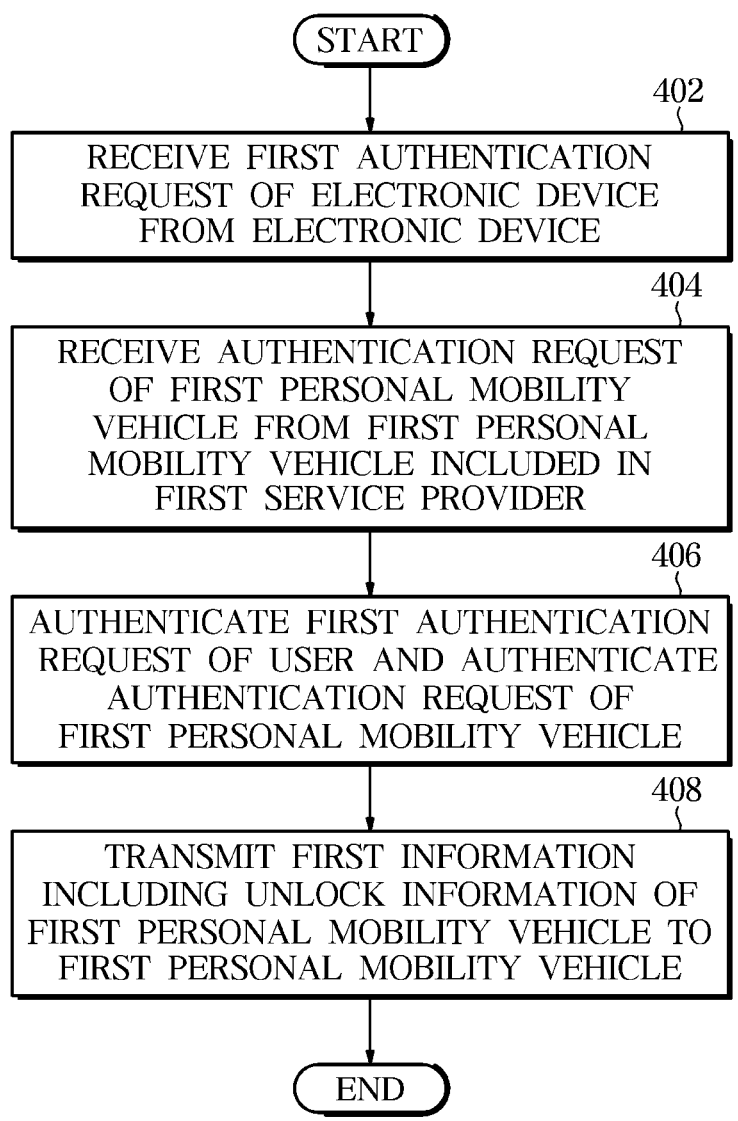

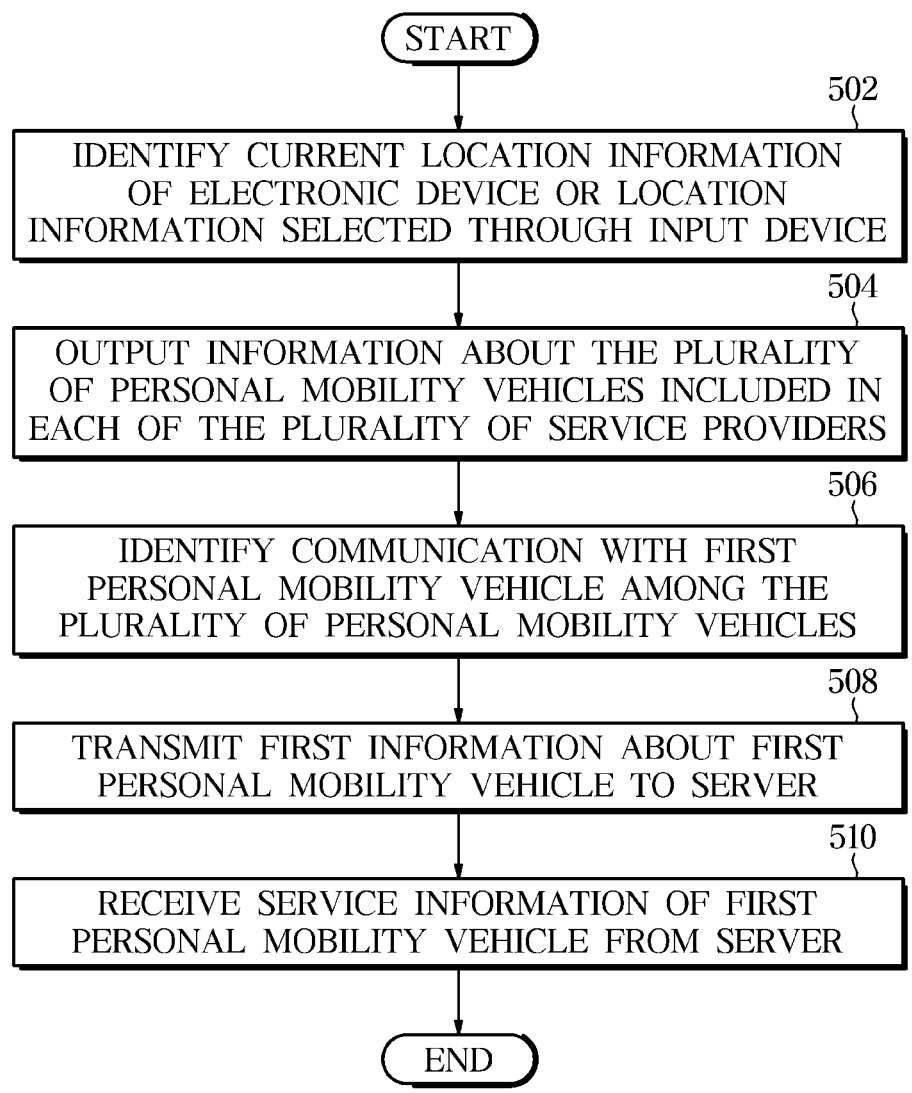

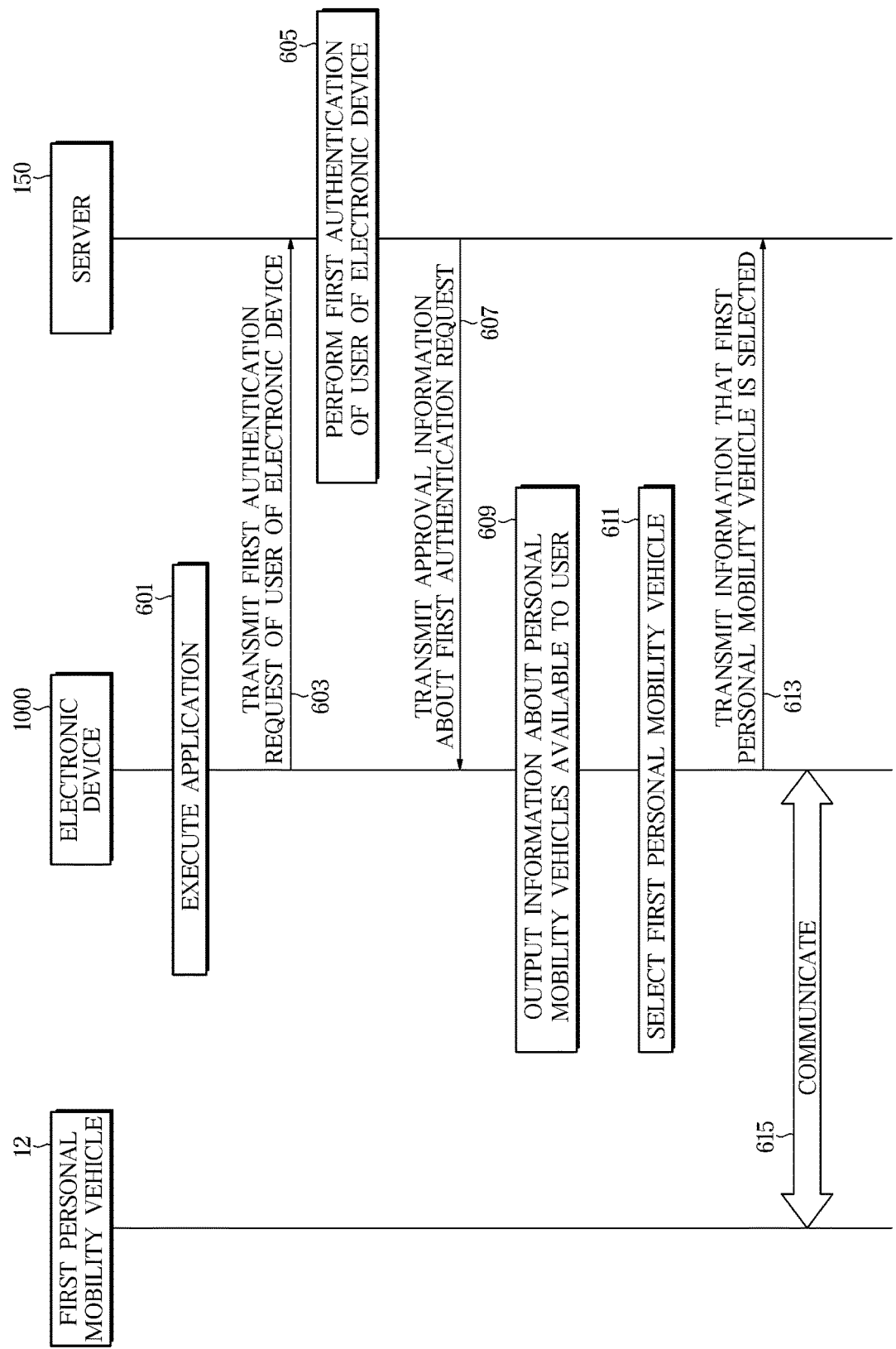

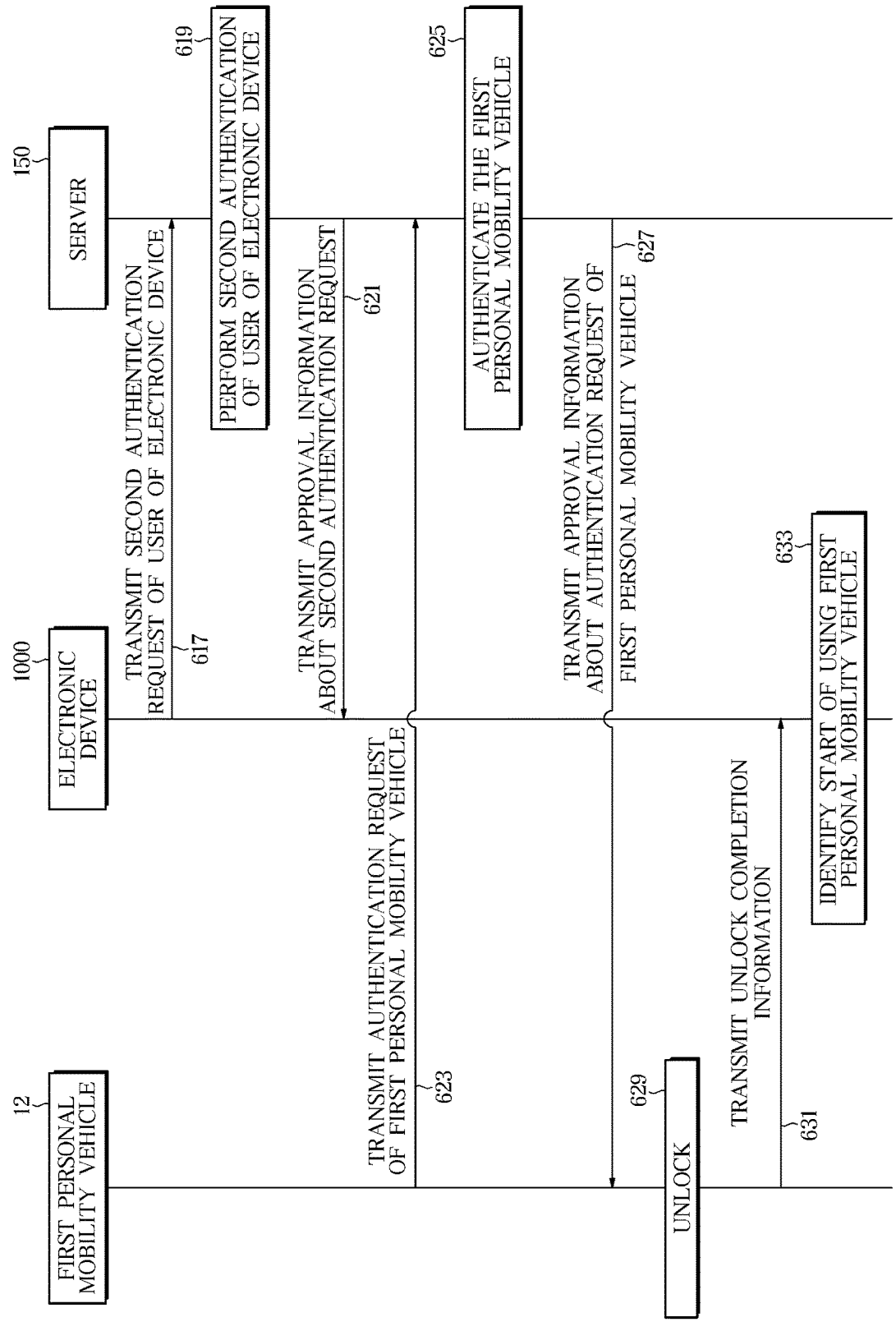

ELECTRONIC DEVICE, SERVER AND METHOD FOR PROVIDING A PERSONAL MOBILITY SERVICE OF A SERVER

CROSS-REFERENCE TO RELATED APPLICATIONS

This application claims the benefit of Korean Patent Application No. 10-2020-0151861, filed on Nov. 13, 2020, which application is hereby incorporated herein by reference.

TECHNICAL FIELD

The disclosure relates to an electronic device, a server, and a method for providing a personal mobility service of the server.

BACKGROUND

A personal mobility vehicle is a device for transporting an individual, and may include an electric wheel, an electric kickboard, an electric skateboard, and/or an electric bicycle. Recently, due to the increase in demand for personal mobility vehicles, the number of personal mobility-sharing service providers has been increased.

Until now, services of the personal mobility-sharing service providers have not been integrated, and thus a single integrated service has not been provided. The personal mobility-sharing service providers each provide separate services so as to allow a user to use only the service of the sharing service providers to which the user has subscribed. Accordingly, in the conventional manner, for a user to use services of different sharing service providers, the user has to install all different applications provided from the sharing service providers and subscribe to the services, which may cause inconvenience.

SUMMARY

Therefore, an embodiment of the disclosure provides an electronic device, a server, and a method for providing a personal mobility service of the server, capable of providing a personal mobility service capable of accommodating various platforms of personal mobility service providers.

For example, an embodiment of the disclosure provides an electronic device, a server, and a method for providing a personal mobility service of the server, capable of providing a personal mobility service capable of allowing a user to rent, use, and return a personal mobility vehicle by using a user's electronic device, and/or to pay a usage fee of the personal mobility vehicle by using the user's electronic device.

Additional embodiments of the disclosure will be set forth in part in the description which follows and, in part, will be obvious from the description, or may be learned by practice of the disclosure.

In accordance with an embodiment of the disclosure, a server includes a communication device, a memory configured to store information about a plurality of personal mobility vehicles and user information about users, and a control device electrically connected to the communication device and the memory. The control device is configured to receive a first authentication request of a user of an electronic device from the electronic device through the communication device, configured to receive an authentication request of a first personal mobility vehicle from the first personal mobility vehicle through the communication device, configured to authenticate the first authentication request of the user based on the user information about the users stored in the memory, and authenticate the authentication request of the first personal mobility vehicle based on the information about the plurality of personal mobility vehicles stored in the memory, and configured to transmit unlock information of the first personal mobility vehicle to the first personal mobility vehicles through the communication device based on the authentication of the first authentication request and the authentication of the authentication request of the first personal mobility vehicle.

The control device may be configured to receive service use request information of the server from the electronic device through the communication device, configured to authenticate, in response to receiving the service use request information of the server, a second authentication request of the user based on the user information about the users stored in the memory, and configured to transmit authentication completion information about the second authentication request of the user to the electronic device through the communication device.

The control device may be configured to receive, from the electronic device through the communication device, at least one piece of information between information about a selection of the first personal mobility vehicle by the electronic device and information about communication between the electronic device and the first personal mobility vehicle, and configured to authenticate the first authentication request and the authentication request of the first personal mobility vehicle based on the reception of the at least one piece of information.

The control device may be configured to transmit authentication completion information about the first authentication request to the electronic device through the communication device, and transmit authentication completion information about the authentication request of the first personal mobility vehicle to the first personal mobility vehicle through the communication device, and configured to transmit unlock information of the first personal mobility vehicle to the first personal mobility vehicle through the communication device based on the transmission of the authentication completion information about the first authentication request and the transmission of the authentication completion information about the authentication request of the first personal mobility vehicle.

The control device may be configured to receive use time information and use distance information of the first personal mobility vehicle from the electronic device through the communication device, configured to calculate, in response to receiving the use time information and the use distance information, a service usage fee of the first personal mobility vehicle of the electronic device based on a predetermined fee calculation condition corresponding to personal mobility vehicle use times and use distances, and configured to transmit information about the service usage fee to the electronic device through the communication device.

When the information of the first personal mobility vehicle is stored in a first server of a first service provider and the user information of the electronic device is stored in a second server of a second service provider, the service usage fee may include a first fee of the first server and a second fee of the second server.

The control device may be configured to receive service information about the first personal mobility vehicle from the first server of the first service provider through the communication device, and configured to transmit the service information about the first personal mobility vehicle to the electronic device through the communication device.

The control device may be configured to convert a communication protocol of the first server into a predetermined standard protocol of the server.

In accordance with another embodiment of the disclosure, an electronic device includes an input device, a display, a communicator, and a processor electrically connected to the input device, the display, and the communicator. The processor is configured to control the display to output information about a plurality of personal mobility vehicles included in each of a plurality of service providers based on current location information of the electronic device or location information selected through the input device, configured to transmit, based on the communication with a first personal mobility vehicle among the plurality of personal mobility vehicles through the communicator, a first information about the first personal mobility vehicle to a server, and configured to receive service information about the first personal mobility vehicle from the server through the communicator in response to the transmission of the first information.

The plurality of personal mobility vehicles may include personal mobility vehicles available in a region corresponding to the current location information of the electronic device or the location information selected through the input device.

The processor may be configured to receive information about a service usage fee of the first personal mobility vehicle from the server through the communicator when the processor identifies termination of the use of the first personal mobility vehicle.

The processor may be configured to identify termination of the use of the first personal mobility vehicle based on a user input through the input device or a release of the communication with the first personal mobility vehicle.

The processor may be configured to transmit use time information and use distance information of the first personal mobility vehicle to the server through the communicator when the processor identifies termination of the use of the first personal mobility vehicle.

The service usage fee of the first personal mobility vehicle may include a first fee based on a first service of a first service provider that provides the service of the first personal mobility vehicle and the use of the first personal mobility vehicle, and a second fee based on a second service of a second service provider subscribed to by the user of the electronic device and the use of a platform of the second service provider.

The selected location information may include information about at least one region selected through the input device, and the plurality of personal mobility vehicles included in each of the plurality of service providers may be located in the at least one region.

The processor may be configured to control the display to output information about whether the plurality of service providers and the plurality of personal mobility vehicles included in the plurality of service providers, which are available to the user of the electronic device, are present or not.

In accordance with another embodiment of the disclosure, a method for providing a personal mobility service of a server includes receiving, by a server, a first authentication request of a user of an electronic device from the electronic device, receiving, by the server, an authentication request of a first personal mobility vehicle from the first personal mobility vehicle, authenticating, by the server, the first authentication request of the user based on pre-stored user information about users, and authenticating, by the server, the authentication request of the first personal mobility vehicle based on pre-stored information about a plurality of personal mobility vehicles, and transmitting, by the server, unlock information of the first personal mobility vehicle to the first personal mobility vehicle based on the authentication of the first authentication request and the authentication of the authentication request of the first personal mobility vehicle.

The method may further include receiving, by the server, service use request information from the electronic device, in response to receiving the service use request information of the server, authenticating, by the server, a second authentication request of the user based on the pre-stored user information about the users, and transmitting, by the server, authentication completion information about the second authentication request of the user to the electronic device.

In accordance with another embodiment of the disclosure, a personal mobility vehicle includes a communication module and a control device electrically connected to the communication module. The control device is configured to communicate with a server through the communication module, configured to identify whether or not the personal mobility vehicle communicates with an electronic device through the communication module based on the electronic device being mounted to at least one portion of a frame, and configured to release the communication with the server based on the communication with the electronic device.

The control device may be configured to receive unlock information of the personal mobility vehicle transmitted from the server through the communication-connected electronic device, and configured to unlock the personal mobility vehicle based on the unlock information.

BRIEF DESCRIPTION OF THE DRAWINGS

These and/or other embodiments of the disclosure will become apparent and more readily appreciated from the following description of exemplary embodiments, taken in conjunction with the accompanying drawings, in which:

FIG. 4 is a flow chart illustrating an operation of a server according to an embodiment of the disclosure;

FIG. 5 is a flow chart illustrating an operation of an electronic device according to an embodiment of the disclosure;

FIGS. 6A and 6B are flow charts illustrating an operation of the system according to an embodiment of the disclosure.

DETAILED DESCRIPTION OF ILLUSTRATIVE EMBODIMENTS

Figure 1:
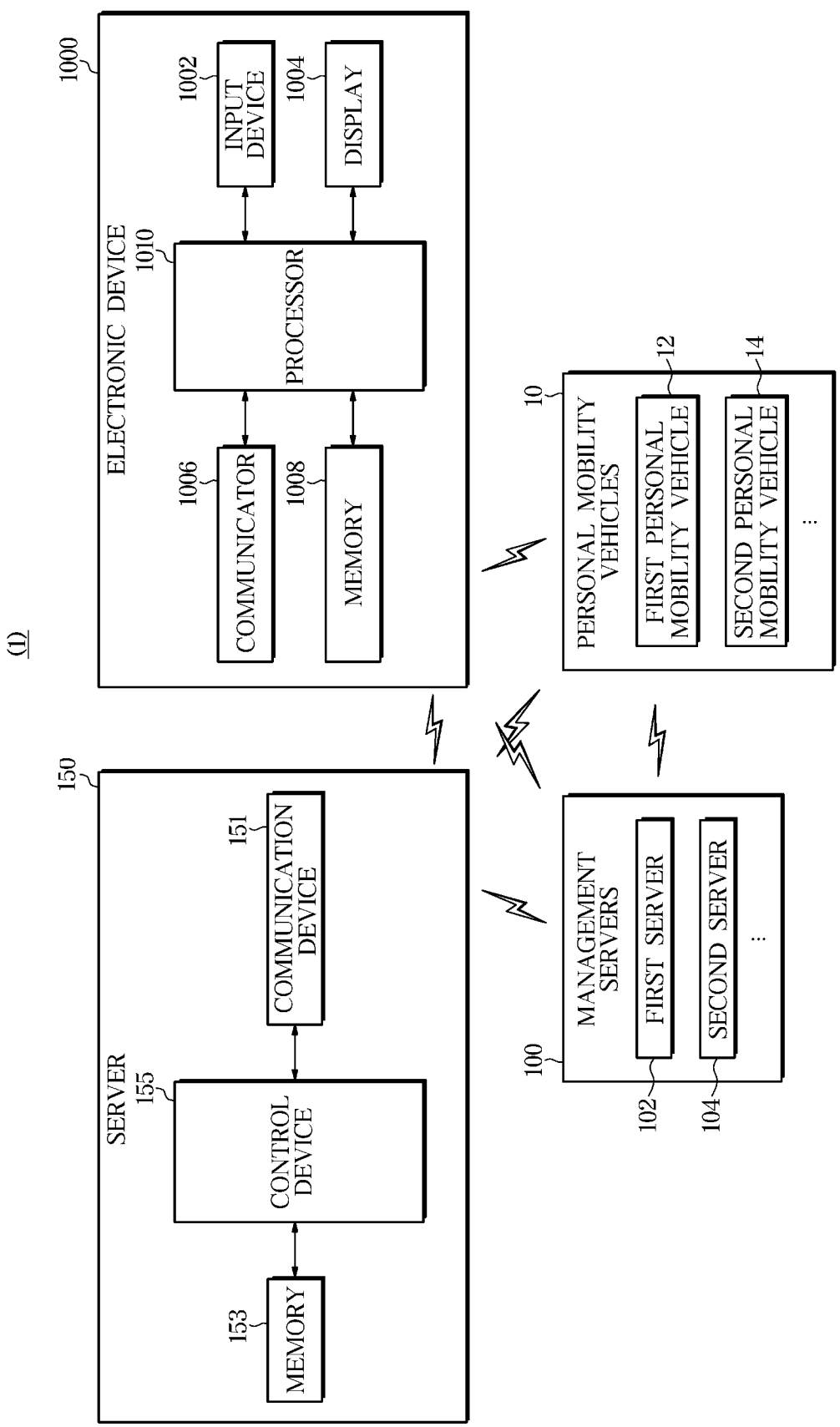
FIG. 1 is a block diagram illustrating a system according to an embodiment of the disclosure.

In the following description, like reference numerals refer to like elements throughout the specification. Well-known functions or constructions are not described in detail since they would obscure one or more exemplar embodiments with unnecessary detail. Terms such as "unit", "module", "member", and "block" may be embodied as hardware or software. According to embodiments, a plurality of "units", "modules", "members", and "blocks" may be implemented as a single component or a single "unit", "module", "member", and "block" may include a plurality of components.

It will be understood that when an element is referred to as being "connected" to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, the specification should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each step may be implemented in an order different from the illustrated order unless the context clearly indicates otherwise.

Reference will now be made in detail to embodiments of the disclosure, examples of which are illustrated in the accompanying drawings.

Figure 2A:
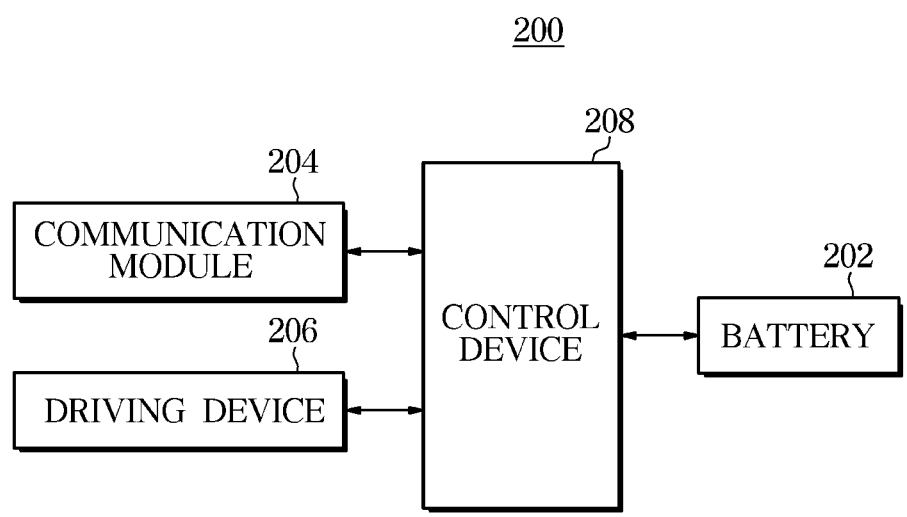
FIG. 2A is a block diagram illustrating a personal mobility vehicle according to an embodiment of the disclosure.
Figure 2B:
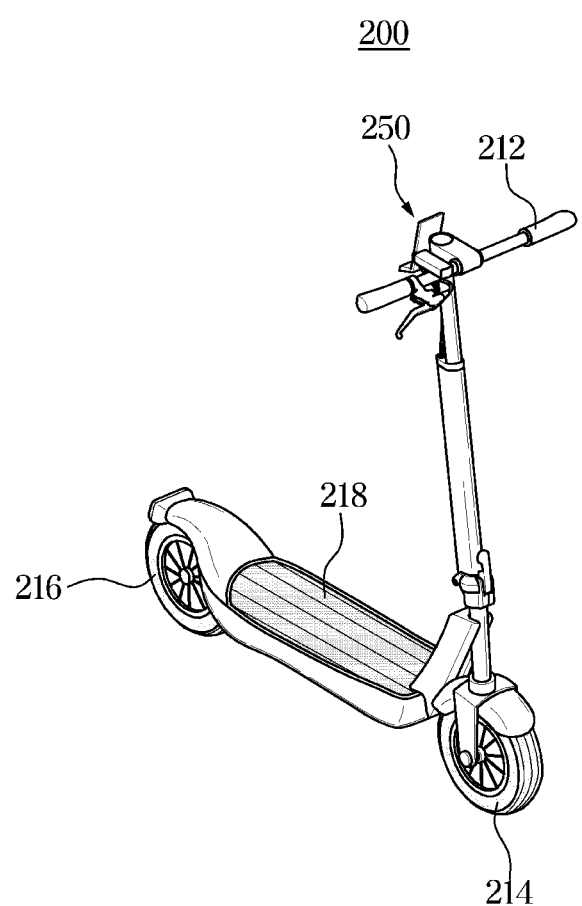
FIG. 2B is a view illustrating a type of the personal mobility vehicle according to an embodiment of the disclosure.

FIG. 1 is a block diagram illustrating a system 1 according to an embodiment of the disclosure, FIG. 2A is a block diagram illustrating a personal mobility vehicle according to an embodiment of the disclosure, and FIG. 2B is a view illustrating a type of the personal mobility vehicle according to an embodiment of the disclosure.

Referring to FIG. 1, the system 1 may include personal mobility vehicles 10, management servers 100, a server 150, and/or an electronic device 1000.

The personal mobility vehicles 10 may include a first personal mobility vehicle 12 and/or a second personal mobility vehicle 14.

The first personal mobility vehicle 12 and the second personal mobility vehicle 14 may include components corresponding to a personal mobility vehicle 200 of FIG. 2A, and may be implemented in a form corresponding to a personal mobility vehicle 200 of FIG. 2B.

Referring to FIG. 2A, the personal mobility vehicle 200 may include a battery 202, a communication module 204, a driving device 206, and/or a control device 208.

The battery 202 may supply power to at least one component of the personal mobility vehicle 200 (the communication module 204, the driving device 206 and/or the control device 208). For example, the battery 202 may supply power required to drive the personal mobility vehicle 200.

The communication module 204 may establish a wired and/or wireless communication channel between the personal mobility vehicle 200 and an external device, such as one of the management servers 100, the server 150 and/or the electronic device 1000, and support the communication between the personal mobility vehicle 200 and the external device through the established communication channel. For example, the communication module 204 may include a wireless communication module (e.g., a cellular communication module, a Wi-Fi communication module, a short-range wireless communication module, or a global navigation satellite system (GNSS) communication module) and/or a wired communication module (e.g., a local area network (LAN) or a power line communication module), and thus the communication module 204 may communicate with the external device. The communication module 204 may include communication circuitry.

The driving device 206 may control at least one motor of the personal mobility vehicle 200 and an operation of the at least one motor, such as a rotation direction and/or a rotation speed. For example, the driving device 206 may be controlled by the control device 208.

The control device 208 (also referred to as a control circuit or a processor) may control at least one other component of the personal mobility vehicle 200 (e.g., a hardware component (e.g., the battery 202, the communication module 204, and/or the driving device 206) or a software component (software program)) and may perform various data processing and calculations.

The control device 208 may include a processor (not shown) and a memory (not shown). For example, an operating system configured to accommodate multiple platforms (iPhone operating system (iOS), alternative operating system (AOS), etc.) may be stored in the memory.

The control device 208 may identify whether the personal mobility vehicle 200 communicates with the electronic device 1000 through the communication module 204.

When a specified condition is satisfied (e.g., periodically at a predetermined time interval), the control device 208 may transmit location information of the personal mobility vehicle 200 to a management server of the personal mobility vehicle 200 among the management servers 100, the server 150 and/or the electronic device 1000 through the communication module 204.

For example, although not shown, the personal mobility vehicle 200 may further include a GPS module. The control device 208 may identify location information of the personal mobility vehicle 200 based on output signals of the GPS module, and the control device 208 may transmit the location information of the personal mobility vehicle 200 to the management server of the personal mobility vehicle 200 among the management servers 100, the server 150 and/or the electronic device 1000 through the communication module 204.

When a specified condition is satisfied (e.g., periodically at a predetermined time interval), the control device 208 may transmit information about the battery 202 (such as a charge amount) to the management server of the personal mobility vehicle 200 among the management servers 100, the server 150 and/or the electronic device 1000 through the communication module 204.

Referring to FIG. 2B, the personal mobility vehicle 200 may include a handle 212, wheels 214 and 216, and/or a footrest 218.

The electronic device 1000 may be positioned and fixed to at least a portion 250 of a frame connected to the handle 212 of the personal mobility vehicle 200.

For example, a structure, such as a mount (also referred to as a bracket) provided to fix the electronic device 1000 to at least a portion of the frame connected to the handle 212 of the personal mobility vehicle 200, may be provided, and thus the electronic device 1000 may be fixed to the personal mobility vehicle 200 through the structure.

The personal mobility vehicle 200 may communicate with the electronic device 1000 through the wired or wireless communication.

For example, the personal mobility vehicle 200 may be implemented in such a way that a cable connected to the personal mobility vehicle 200 is connected to a connection terminal of the electronic device 1000 when the electronic device 1000 is mounted to the at least a portion 250 of the frame of the personal mobility vehicle 200.

Alternatively, the personal mobility vehicle 200 may communicate with the electronic device 1000 through the wireless communication based on a control signal received from the electronic device 1000 through the communication module 204, or based on a user input through an input device (not shown) of the personal mobility vehicle 200.

For example, when the personal mobility vehicle 200 communicates with the electronic device 1000 through the wired or wireless communication, the battery 202 of the personal mobility vehicle 200 may be automatically charged. For example, the personal mobility vehicle 200 may further include a wireless charging circuit (not shown), and thus when the electronic device 1000 is mounted on the at least a portion 250 of the frame, the personal mobility vehicle 200 may wirelessly receive power from the electronic device 1000 through the wireless charging circuit.

For example, when the personal mobility vehicle 200 communicates with the electronic device 1000 through the wired or wireless communication, the personal mobility vehicle 200 may allow the electronic device 1000 to perform functions, such as a function of providing information about the battery 202 (such as a charging amount) of the personal mobility vehicle 200, a function of communication with the management server of the personal mobility vehicle 200 among the management servers 100, and/or the server 150 and/or a navigation function.

Although not shown, the personal mobility vehicle 200 may further include components such as a radar, a front light, an audio device, a rear wheel cover, a braking device, a suspension, a brake lever, a pressure sensor, a rear light and/or a haptic device.

In addition, a minimum of simple mechanisms and functions may be applied to the personal mobility vehicle 200, and a complicated operation process is performed in the communication-connected electronic device 1000. Accordingly, it is possible to minimize the complicated operation process of the personal mobility vehicle 200 so as to reduce a manufacturing cost.

The management servers 100 may include a first server 102 and/or a second server 104.

The management servers 100 may be servers for service provision of service providers that provide a sharing service of the personal mobility vehicles 10.

For example, the management servers 100 may be servers of service providers registered (or subscribed) to the service of the server 150.

For example, each of a plurality of service providers may locate the personal mobility vehicles 10 in one region or several regions, and provide a sharing service that allows users to use the personal mobility vehicles 10.

For example, when it is assumed that a plurality of service providers includes a first service provider and a second service provider, the first server 102 may be a server of the first service provider, and the second server 104 may be a server of the second service provider. For example, the first service provider may provide a sharing service of personal mobility vehicles 10 of a first region, and the second service provider may provide a sharing service of personal mobility vehicles 10 of a second region.

The first server 102 may provide a sharing service for personal mobility vehicles including a first personal mobility vehicle 12 of the first service provider. The second server 104 may provide a sharing service for personal mobility vehicles including a second personal mobility vehicle 14 of the second service provider.

Although not shown, each of the first server 102 and the second server 104 may include a communication device configured to communicate with an external device, a memory configured to store data, and a control device configured to control components and configured to perform various data processing and calculation.

The server 150 may include a communication device 151, a memory 153, and a control device 155.

The communication device 151 (also referred to as communication circuitry) may establish a wired and/or wireless communication channel between the server 150 and an external device, such as the personal mobility vehicles 10, the management servers 100 and/or the electronic device 1000, and support the communication between the server 150 and the external device through the established communication channel. For example, the communication device 151 may include a wireless communication module (e.g., a cellular communication module, a Wi-Fi communication module, a short-range wireless communication module, or a global navigation satellite system (GNSS) communication module) and thus the communication device 151 may communicate with the external device. The communication device 151 may include communication circuitry.

The memory 153 may store various data used by at least one component (the communication device 151 and/or the control device 155) of the server 150, particularly, the memory 153 may store input data or output data about software programs and instructions related to the software program. For example, the memory 153 may include a volatile memory and/or a non-volatile memory.

The memory 153 may store a program (or application program) related to sharing and/or management of the personal mobility vehicles 10.

The memory 153 may store information about the plurality of personal mobility vehicles 10 included in the plurality of service providers, for example, servers of the plurality of service providers, that is, the management servers 100. For example, the information about the plurality of personal mobility vehicles 10 may include identification information and information about a service provider corresponding to each of the plurality of personal mobility vehicles 10.

The memory 153 may store user information about a user who is subscribed to services of the plurality of service providers.

The control device 155 (also referred to as a control circuit or a processor) may control at least one other component of the server 150 (e.g., a hardware component (e.g., the communication device 151 and/or the memory 153) or a software component (software program)) and may perform various data processing and calculations. The control device 155 may include a processor and a memory.

The control device 155 may manage the personal mobility vehicles 10 based on information that is about the personal mobility vehicles 10 included in the plurality of service providers and is stored in the memory 153.

Based on user information that is about a user who is subscribed to the service of each of the plurality of service providers and that is stored in the memory 153, the control device 155 may provide a sharing service that allows a user to use the personal mobility vehicles 10.

For example, based on the communication between the electronic device 1000 and the first personal mobility vehicle 12 through the communication device 151, the control device 155 may perform user authentication for a user, having an intention to use the first personal mobility vehicle 12, of the electronic device 1000 and authentication of the first personal mobility vehicle 12.

For example, in order to unlock the first personal mobility vehicle 12, the control device 155 may transmit first information including unlock information of the first personal mobility vehicle 12 to the first personal mobility vehicle 12 through the communication device 151.

For example, the control device 155 may receive service information related to the first personal mobility vehicle from the first server 102 of the first service provider through the communication device 151, and transmit the information to the electronic device 1000. For example, when the control device 155 receives at least one piece of information, which is between information about selection of the first personal mobility vehicle 12 by the electronic device 1000 and information about communication between the electronic device 1000 and the first personal mobility vehicle 12, from the electronic device 1000 through the communication device 151, the control device 155 may receive service information about the first personal mobility vehicle 12 from the first server 102.

For example, when the control device 155 receives information about completion of use of the first personal mobility vehicle 12 from the electronic device 1000 through the communication device 151, the control device 155 may calculate a service usage fee according to the use of the first personal mobility vehicle 12, and transmit information about the service usage fee to the electronic device 1000.

The electronic device 1000 may include an input device 1002, a display 1004, a communicator 1006, a memory 1008, and/or a processor 1010.

The input device 1002 may receive a command or data from an external (e.g., a user) of the electronic device 1000. For example, the input device 1002 may include a keypad, a touch screen, and/or a microphone.

The display 1004 may visually provide information to the user of the electronic device 1000. For example, the display 1004 may include a liquid crystal display (LCD), a light emitting diode (LED) display, and/or an organic light emitting diode (OLED) display. For example, the display 1004 may display a variety of content (e.g., text, images, videos, icons and/or symbols).

The display 1004 may include a touchscreen, and may receive a touch, a gesture, proximity, and/or hovering input using an electronic pen or a part of the user's body.

The communicator 1006 (also referred to as communication circuitry) may establish a wired and/or wireless communication channel between the electronic device 1000 and an external device, such as the personal mobility vehicles 10, the management servers 100 and/or the server 150, and support the communication between the electronic device 1000 and the external device through the established communication channel. For example, the communicator 1006 may include a wireless communication module (e.g., a cellular communication module, a Wi-Fi communication module, a short-range wireless communication module, or a global navigation satellite system (GNSS) communication module) and/or a wired communication module (e.g., a local area network (LAN) or a power line communication module), and thus the communicator 1006 may communicate with the external device. The communicator 1006 may include communication circuitry.

The memory 1008 may store various data used by at least one component (the input device 1002, the display 1004, the communicator 1006, and/or the processor 1010) of the electronic device 1000, particularly, the memory 1008 may store input data and output data about software programs and instructions related to the software program. For example, the memory 1008 may include a volatile memory and/or a non-volatile memory.

The memory 1008 may store a program (or application program) of the sharing service of the personal mobility vehicles 10 related to sharing and/or managing of the personal mobility vehicles 10.

The processor 1010 (also referred to as a control circuit or a control device) may control at least one other component of the electronic device 1000 (e.g., a hardware component (e.g., the input device 1002, the display 1004, the communicator 1006 and/or the memory 1008) or software components (software programs)), and perform various data processing and calculation. The processor 1010 may include a memory.

The processor 1010 may allow a user to subscribe to any one service among the plurality of service providers based on a user input through the input device 1002.

The processor 1010 may request authentication of the user of the electronic device 1000 based on the communication with the server 150 through the communicator 1006.

For example, when an application of the sharing service is executed, and/or when a user logs in after executing the application of the sharing service, the processor 1010 may request authentication of the user of the electronic device 1000 to the server 150 through the communicator 1006.

For example, when the electronic device 1000 communicates with any one personal mobility vehicle, such as the first personal mobility vehicle 12, through the wired or wireless communication, the processor 1010 may request the authentication of the user of the electronic device 1000 to the server 150 through the communicator 1006.

Based on current location information of the electronic device 1000 or location information selected through the input device 1002, the processor 1010 may control the display 1004 to output information about the plurality of personal mobility vehicles 10 included in each of the plurality of service providers.

For example, although not shown, the electronic device 1000 may further include a GPS module, and the processor 1010 may identify current location information of the electronic device 1000 through the GPS module. Alternatively, the processor 1010 may identify location information about a selected location based on a user input through the input device 1002.

For example, the processor 1010 may control the display 1004 to output only information about the plurality of personal mobility vehicles 10 included in each of the plurality of service providers located in a region corresponding to the current location information of the electronic device 1000 or the selected location information.

Based on the current location information of the electronic device 1000, the processor 1010 may provide information about a personal mobility vehicle available to the user of the electronic device 1000.

Based on the communication with any one personal mobility vehicle, such as the first personal mobility vehicle 12, among the plurality of personal mobility vehicles through the communicator 1006, the processor 1010 may transmit first information about the first personal mobility vehicle 12 to the server 150.

For example, the first information about the first personal mobility vehicle 12 may include identification information of the first personal mobility vehicle 12 and/or information of the first service provider of the first personal mobility vehicle 12.

When the electronic device 1000 communicates with the personal mobility vehicle 10, the processor 1010 may control the display 1004 to output a predetermined user interface (UI) for controlling the electronic device 1000.

In response to the transmission of the first information about the first personal mobility vehicle 12, the processor 1010 may receive information about the first personal mobility vehicle 12 from the server 150 through the communicator 1006.

For example, service information about the first personal mobility vehicle 12 may include information about a description of a function, a usage fee, an available time and/or an available distance of the first personal mobility vehicle 12.

When the use of the first personal mobility vehicle 12 is terminated, the processor 1010 may perform the authentication of the user of the electronic device 1000, locking of the first personal mobility vehicle 12 and/or payment of the usage fee of the first personal mobility vehicle 12 based on the communication with the server 150 and/or the communication with the first personal mobility vehicle 12 through the communicator 1006.

For example, in order to allow a user to check a usage fee of the first personal mobility vehicle 12, the processor 1010 may output information of the first personal mobility vehicle 12 used by the user, information about the first service provider of the first personal mobility vehicle 12, and usage fee details, on the display 1004.

The electronic device 1000 may include a smartphone, a tablet personal computer, a mobile phone, and/or a wearable device.

Figure 3:
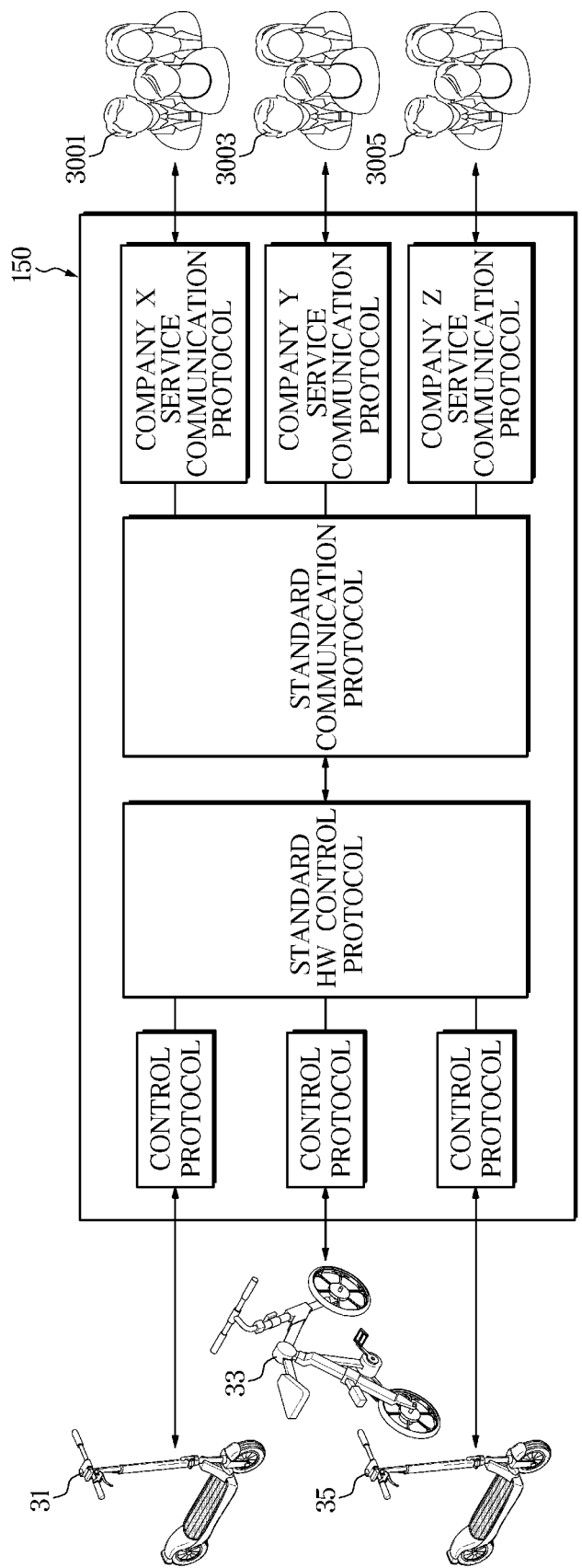
FIG. 3 is a view illustrating an operation of the system according to an embodiment of the disclosure.

FIG. 3 is a view illustrating an operation of the system 1 according to an embodiment of the disclosure.

Referring to FIG. 3, the server 150 may be implemented with a standardized platform architecture, and may be configured to control different kinds of devices and different kinds of services by integrating hardware control protocols and communication protocols.

The server 150 may be configured to standardize protocols different for each device and/or sharing service in a sharing service platform of the personal mobility vehicles 10, and configured to allow the sharing service platform of the personal mobility vehicles 10 to be applicable to the device and/or the service to which the different protocols are applied.

For example, when the server 150 communicates with a first personal mobility vehicle 31 of a company A, a second personal mobility vehicle 33 of the company A, and a third personal mobility vehicle 35 of a company B, the server 150 may convert a control protocol of the first personal mobility vehicle 31 of the company A, a control protocol of the second personal mobility vehicle 33 of the company A, and a control protocol of the third personal mobility vehicle 35 of the company B into a standard hardware control protocol so as to standardize each of the protocols.

For example, when the server 150 communicates with a first electronic device 3001 of a user using a service of a company X, a second electronic device 3003 of a user using a service of a company Y, and a third electronic device 3005 of a user using a service of a company Z, the server 150 may convert a service communication protocol of a server of the company X, a service communication protocol of a server of the company Y, and a service communication protocol of a server of the company Z into a standard communication protocol so as to standardize each of the protocols.

The standardization of protocol is a known technique, and detailed description of standardization of each protocol is omitted.

The server 150 configured to standardize a control protocol and a communication protocol may provide a compatibility function, and particularly, when a service provider, which provides a personal mobility service subscribed to by a user, is different from a service provider that manages a personal mobility vehicle that the user wants to use, the compatibility function is capable of allowing the user to use the personal mobility vehicle that the user wants to use, through a user's electronic device 1000.

The electronic device 1000, which communicates with one of the personal mobility vehicles 10, such as the first personal mobility vehicle 12, may assist communication between an external device and the first personal mobility vehicle 12 through the communication.

For example, in comparison with the first personal mobility vehicle 12, the electronic device 1000 may more efficiently perform an operation, such as subscription to the service provider, user authentication, and payment for the first personal mobility vehicle 12.

For example, the electronic device 1000 may receive a message from the first service provider of the first personal mobility vehicle 12 through subscription to the service provided by the first service provider of the first personal mobility vehicle 12. In this case, the service provider of the first personal mobility vehicle 12 may secure a service royalty.

FIG. 4 is a flow chart illustrating an operation of the server 150 (and/or the control device 155 of the server 150) according to an embodiment of the disclosure.

The server 150 may receive a first authentication request of a user of the electronic device 1000 from the electronic device 1000 through the communication device 151 (402).

Through the communication device 151, the server 150 may receive an authentication request of the first personal mobility vehicle 12 from the first personal mobility vehicle 12 included in the first service provider among the plurality of service providers (404).

The server 150 may authenticate the first authentication request of the user of the electronic device 1000 and authenticate the authentication request of the first personal mobility vehicle 12 (406).

The server 150 may authenticate the first authentication request of the user of the electronic device 1000 based on user information that is about a user who is subscribed to the services of each of the plurality of service providers and is stored in the memory 153.

For example, subscription to the services of each of the plurality of service providers may indicate that user information is stored in the server of each of the plurality of service providers.

The server 150 may authenticate the authentication request of the first personal mobility vehicle 12 based on information that is about the plurality of personal mobility vehicles 10 included in each of the plurality of service providers and is stored in the memory 153.

For example, through the communication device 151, the server 150 may receive at least one piece of information, which is between information about the selection of the first personal mobility vehicle 12 by the electronic device 1000 and information about the communication between the electronic device 1000 and the first personal mobility vehicle 12, from the electronic device 1000. Based on the reception of the least one piece of information, the server 150 may authenticate the first authentication request of the user of the electronic device 1000 and authenticate the authentication request of the first personal mobility vehicle 12.

Based on the authentication for the first authentication request, and the authentication for the authentication request of the first personal mobility vehicle 12, the server 150 may transmit first information including unlock information of the first personal mobility vehicle 12 to the first personal mobility vehicle 12 through the communication device 151 (408).

When the server 150 completes the authentication (also referred to as authentication approval) based on the performance of the authentication of the first authentication request, the server 150 may transmit authentication completion information about the first authentication request to the electronic device 1000 through the communication device 151.

When the server 150 completes the authentication (also referred to as authentication approval) based on the performance of the authentication of the first personal mobility vehicle 12, the server 150 may transmit authentication completion information about the authentication request of the first personal mobility vehicle 12 to the first personal mobility vehicle 12 through the communication device 151.

Based on the transmission of the authentication completion information about the first authentication request and the transmission of the authentication completion information about the authentication request of the first personal mobility vehicle 12, the server 150 may transmit the first information including the unlock information of the first personal mobility vehicle 12 to the first personal mobility vehicle 12 through the communication device 151. For example, the first information may further include the authentication completion information about the first authentication request.

In addition to the above-described embodiment, the server 150 may receive service use request information of the server 150 from the electronic device 1000 through the communication device 151.

For example, the service use request information of the server 150 may be information transmitted by the electronic device 1000 when the electronic device 1000 executes the application of the sharing service and/or when a user logs in after the execution of the application of the sharing service.

In response to the reception of the service use request information of the server 150, the server 150 may authenticate a second authentication request of the user of the electronic device 1000 based on the user information that is about the user who is subscribed to the services of each of the plurality of service providers and is stored in the memory 153.

Based on the completion of the authentication for the second authentication request, the server 150 may transmit authentication completion information about the second authentication request of the user to the electronic device 1000 through the communication device 151.

In addition to the above-described embodiment, the server 150 may receive second information including use time information and use distance information of the first personal mobility vehicle 12 from the electronic device 1000.

In response to the reception of the second information, the server 150 may calculate a service usage fee of the first personal mobility vehicle 12 of the user of the electronic device 1000 based on a predetermined fee calculation condition of the plurality of service providers corresponding to the personal mobility vehicle use time and use distance.

For example, when the information of the first personal mobility vehicle is stored in the first server 102 of the first service provider and the user information of the electronic device 1000 is stored in the second server of the second service provider, the service usage fee may include a first fee of the first service provider and a second fee of the second service provider.

For example, that the information of the user of the electronic device 1000 is stored (or registered) in the second server 104 of the second service provider may mean that the user of the electronic device 1000 is subscribed to the service of the second service provider.

For example, the first fee may be determined based on a first service of the first service provider and the use of the first personal mobility vehicle 12. The second fee may be determined based on a second service of the second service provider and the use of the platform of the second service provider.

The server 150 may transmit information about the service usage fee of the first personal mobility vehicle 12 to the electronic device 1000 through the communication device 151.

Further, in addition to the above-described embodiment, the server 150 may receive service information related to the first personal mobility vehicle 12 from the first server 102 of the first service provider through the communication device 151.

For example, the server 150 may convert the communication protocol of the first server 102 into a predetermined standard protocol of the server 150 and based on this, the server 150 may receive service information about the first personal mobility vehicle 12 from the first server 102.

For example, the service information about the first personal mobility vehicle 12 may include a description of a function, a usage fee, an available time and/or an available distance of the first personal mobility vehicle 12.

The server 150 may transmit the service information related to the first personal mobility vehicle 12 to the electronic device 1000 through the communication device 151.

In addition to the above-described embodiment, the server 150 may receive a personal mobility vehicle search request from the electronic device 1000.

In response to the reception of the personal mobility vehicle search request from the electronic device 1000, the server 150 may search for a personal mobility vehicle and transmit information about the searched personal mobility vehicle to the electronic device 1000.

Accordingly, the electronic device 1000 receiving the information about the personal mobility vehicle from the server 150 may select the first personal mobility vehicle 12 through a user input, and communicate with the first personal mobility vehicle 12.

In addition to the above-described embodiment, the server 150 may identify protocols of the electronic device 1000 and the first server 102 when performing the above-described operations, and when the protocols are different, the server 150 may perform standardization of the protocols (translation and re-transmission between protocols, etc.)

FIG. 5 is a flow chart illustrating an operation of the electronic device 1000 (and/or the processor 1010 of the electronic device 1000) according to an embodiment of the disclosure.

The electronic device 1000 may identify current location information of the electronic device 1000 or location information selected through the input device 1002 (502).

Based on the current location information of the electronic device 1000 or the location information selected through the input device 1002, the electronic device 1000 may control the display 1004 to output information about the plurality of personal mobility vehicles 10 included in each of the plurality of service providers (504).

The plurality of personal mobility vehicles may include personal mobility vehicles available in a region corresponding to the current location information of the electronic device 1000 or the location information selected through the input device 1002.

The electronic device 1000 may identify communication with the first personal mobility vehicle 12 among the plurality of personal mobility vehicles 10 through the communicator 1006 (506).

The electronic device 1000 may transmit first information about the first personal mobility vehicle 12 to the server 150 based on the communication with the first personal mobility vehicle 12 (508).

In response to the transmission of the first information, the electronic device 1000 may receive service information of the first personal mobility vehicle 12 from the server 150 through the communicator 1006 (510).

For example, the service information related to the first personal mobility vehicle 12 may include information about a description of a function, a usage fee, an available time and/or an available distance of the first personal mobility vehicle 12.

In addition to the above-described embodiment, the electronic device 1000 may provide notification, such as information about a service region in which personal mobility vehicles are available (and/or information about whether available personal mobility vehicles are present or not), to a user based on the location information of the electronic device 1000.

Further, in addition to the above-described embodiment, the electronic device 1000 may identify termination of the use of the first personal mobility vehicle 12 based on a user input through the input device 1002 or the release of the communication with the first personal mobility vehicle 12.

When the electronic device 1000 identifies termination of the use of the first personal mobility vehicle 12, the electronic device 1000 may receive information about the service usage fee of the first personal mobility vehicle 12 from the server 150 through the communicator 1006.

For example, the service usage fee of the first personal mobility vehicle 12 may include the first fee based on the first service of the first service provider providing the service of the first personal mobility vehicle 12 and the use of the first personal mobility vehicle 12, and the second fee based on the second service of the second service provider subscribed to by the user of the electronic device 1000, and the use of the platform of the second service provider.

Based on the reception of information about the service usage fee, the electronic device 1000 may provide a payment function that allows the user to pay the usage fee. When the electronic device 1000 provides the payment function, the electronic device 1000 may provide information about the first personal mobility vehicle 12 corresponding to a payment target and information about companies of the payment target, such as the first and second service providers.

When the electronic device 1000 identifies the termination of the use of the first personal mobility vehicle 12, the electronic device 1000 may transmit the use time information and the use distance information of the first personal mobility vehicle 12 to the server 150 through the communicator 1006.

When the electronic device 1000 identifies the termination of the use of the first personal mobility vehicle 12, the electronic device 1000 may transmit use termination information including lock information to lock the first personal mobility vehicle 12 to the first personal mobility vehicle 12 through the communicator 106.

FIGS. 6A and 6B are flow charts illustrating an operation of the system 1 according to an embodiment of the disclosure.

The electronic device 1000 (and/or the processor 1010 of the electronic device 1000) may execute the application that provides the sharing service of the personal mobility vehicles 10 (601).

In response to the execution of the application that provides the sharing service of the personal mobility vehicles 10, the electronic device 1000 may identify pre-stored user login information or receive login information through the user input, and based on this, the electronic device 1000 may perform a user login operation.

In response to the execution of the application, the electronic device 1000 may transmit the first authentication request of the user of the electronic device 1000 to the server 150 through the communicator 1006 (603).

Based on the reception of the first authentication request, the server 150 (and/or the control device 155 of the server 150) may perform first authentication of the user of the electronic device 1000 (605).

The server 150 may complete, that is approve, the first authentication of the user of the electronic device 1000 based on the reception of the first authentication request.

The server 150 may transmit approval information about the first authentication request through the communication device 151 in response to the performance of the first authentication (607).

The electronic device 1000 may output information about the personal mobility vehicles 10 available to the user based on the reception of approval information about the first authentication request through the communicator 1006 (609).

Figure 7:
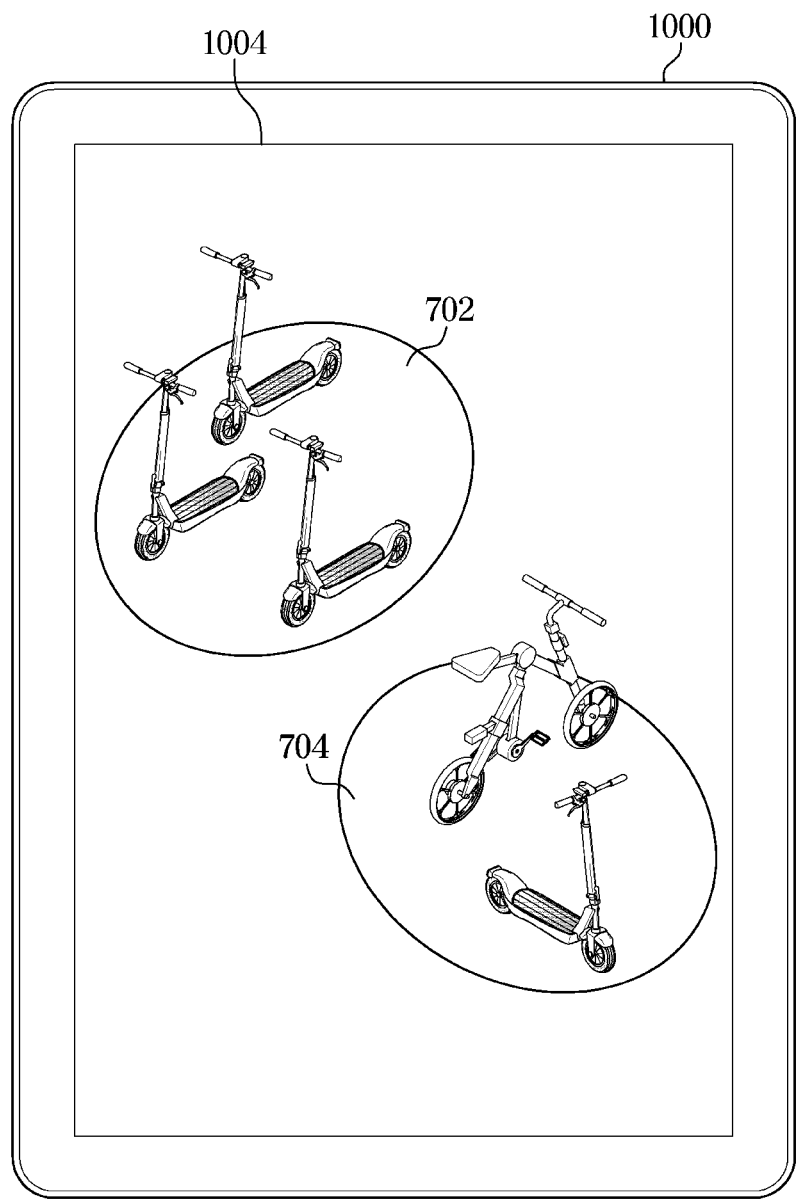
FIG. 7 is a view illustrating a screen of a display of the electronic device according to an embodiment of the disclosure.

As shown in FIG. 7, the electronic device 1000 may control the display 1004 to output a screen of information about the personal mobility vehicles 10 available to the user.

FIG. 7 is a view illustrating a screen of the display 1004 of the electronic device 1000 according to an embodiment of the disclosure.

Referring to FIG. 7, when service providers of personal mobility vehicles available to a user are a first service provider 702 and a second service provider 704, the electronic device 1000 may provide visual effects to distinguish the two companies from each other. Further, the electronic device 1000 may visually display the available personal mobility vehicles included in the first service provider 702, and visually display the available personal mobility vehicles included in the second service provider 704.

The electronic device 1000 may identify the selection of the first personal mobility vehicle 12 of the first service provider in response to the output information of the personal mobility vehicles available to the user (611).

The electronic device 1000 may identify the selection of the first personal mobility vehicle 12 based on a user input through the input device 1002.

The electronic device 1000 may transmit information that the first personal mobility vehicle 12 is selected to the server 150 through the communicator 1006 (613).

The electronic device 1000 may communicate with the first personal mobility vehicle 12 (615).

Based on the electronic device 1000 being mounted to the first personal mobility vehicle 12 or based on the user input through the input device 1002, the electronic device 1000 may communicate with the first personal mobility vehicle 12 through the wired or wireless communication.

Based on the selection of the first personal mobility vehicle 12 and/or the communication with the first personal mobility vehicle 12, the electronic device 1000 may transmit a second authentication request of the user of the electronic device 1000 to the server 150 through the communicator 1006 (617).

The server 150 may perform second authentication of the user of the electronic device 1000 based on the reception of the second authentication request (619).

Based on the performance of the second authentication, the server 150 may transmit approval information about the second authentication request to the electronic device 1000 through the communication device 151 (621).

The first personal mobility vehicle 12 may transmit an authentication request of the first personal mobility vehicle 12 to the server 150 through the communication module based on the communication with the electronic device 1000 (623).

The server 150 may authenticate the first personal mobility vehicle 12 based on the authentication request of the first personal mobility vehicle 12 (625).

Based on the performance of the authentication of the first personal mobility vehicle 12, the server 150 may transmit approval information about the authentication request of the first personal mobility vehicle 12 to the first personal mobility vehicle 12 through the communication device 151 (627).

Based on the reception of the approval information, the first personal mobility vehicle 12 may unlock the first personal mobility vehicle 12 (629).

Based on the unlocking of the first personal mobility vehicle 12, the first personal mobility vehicle 12 may transmit unlock completion information to the electronic device 1000 through the communication module (631).

Based on the reception of the unlock completion information, the electronic device 1000 may identify start of using the first personal mobility vehicle 12 (633).

In addition to the above-described embodiment, when communicating with the first personal mobility vehicle 12, the electronic device 1000 may transmit the information related to the communication with the first personal mobility vehicle 12 to the server 150.

In addition to the above-described embodiment, the user of the electronic device 1000 may be subscribed to (referred to as registration authentication) a service of one of the service providers, which is registered in the sharing service of the personal mobility vehicles 10 of the server 150, such as a service of the first service provider (referred to as a local service) or a service of the second service provider.

Accordingly, the user of the electronic device 1000 may use the sharing service of the personal mobility vehicles 10 of the server 150, based on the information of the user subscribed to the service of one of the service providers, which is registered in the sharing service of the personal mobility vehicles 10 of the server 150.

For example, the electronic device 1000 may use a sharing service of the personal mobility vehicles 10 of the server 150 through the login to a service of any one service provider.

In addition to the above-described embodiment, when the server 150 receives information that the electronic device 1000 selects the first personal mobility vehicle 12, the server 150 may identify that a reservation process of the first personal mobility vehicle 12 is in progress.

The server 150, which identifies that the reservation process of the first personal mobility vehicle 12 is in progress, may identify whether or not the electronic device 1000 communicates with the first personal mobility vehicle 12 within a predetermined reservation effective time (e.g., 5 minutes).

When the electronic device 1000 does not communicate with the first personal mobility vehicle 12 within the predetermined reservation effective time (e.g., 5 minutes), the server 150 may identify that the reservation process of the first personal mobility vehicle 12 is canceled. For example, when the server 150 does not receive information that the electronic device 1000 communicates with the first personal mobility vehicle 12, from the electronic device 1000, the server 150 may identify that the reservation process of the first personal mobility vehicle 12 is canceled.

During the predetermined reservation effective time, the server 150 may prevent the first personal mobility vehicle 12 from being exposed to another user through the communication device 151 or the server 150 may provide information that the reservation process is in progress to another user. Therefore, during the predetermined reservation effective time, another user cannot select the first personal mobility vehicle 12.

When the electronic device 1000 does not communicate with the first personal mobility vehicle 12 within the predetermined reservation effective time, the server 150 may expose the first personal mobility vehicle 12 to another user or the server 150 may stop providing information that the reservation process is in progress in order that another user can select the first personal mobility vehicle 12.

In addition to the above-described embodiment, when the user of the electronic device 1000 terminates the use of the first personal mobility vehicle 12, the electronic device 1000 may communicate with the server 150 to allow the server 150 to perform the user authentication, to transmit the information about locking the first personal mobility vehicle 12 to the first personal mobility vehicle 12, and to transmit information related to a service usage fee of the first personal mobility vehicle 12 to the electronic device 1000. Therefore, it is possible to allow the user to pay the service usage fee through the electronic device 1000.

In addition to the above-described embodiment, the server 150 may identify a protocol (e.g., a control protocol and a communication protocol) of the electronic device 1000 and a protocol (e.g., a control protocol and a communication protocol) of the first server 102 of the first service provider. When the protocol of the electronic device 1000 is different from the protocol of the first server 102, the server 150 may perform standardization of protocols (translation and retransmission between protocols, etc.). The server 150 may perform communication between the electronic device 1000 and the first server 102 based on standardization of protocols.

Further, according to the above-described embodiment, it is possible to enhance the service stability by performing double user authentication, the first authentication of the user, and the second authentication of the user. For example, when the electronic device 1000 executes an application and when the electronic device 1000 communicates with the first personal mobility vehicle 12, the electronic device 1000 may perform the user authentication through the communication with the first server 102, and thus it is possible to secure the stability of the sharing service of the personal mobility vehicles 10.

According to the above-described embodiment, a user may control the personal mobility vehicles 12, 14, and 200, which have a simple structure, through a personal device, such as the electronic device 1000, and the electronic device 1000 may use personal mobility vehicles of different service providers by sharing the function of the personal mobility vehicle.

Through the electronic device 1000, a user may subscribe to a service of any one service provider that provides a personal mobility sharing service in a frequently used region.

Based on subscription information about the service of any one service provider, the user may use not only the subscribed service of the service provider but also an unsubscribed service of a service provider through the electronic device 1000.

For example, the electronic device 1000 may identify a personal mobility vehicle available in a desired location based on the location of the electronic device 1000 or location information selected by the user.

For example, through the communication with the personal mobility vehicle and the communication with the server 150 in which the services of the service providers are registered, the electronic device 1000 may allow the user to use a personal mobility vehicle of a service provider to which the user is not subscribed. In this case, the server 150 may provide a standard protocol in the control and communication, and standardize different protocols between the electronic device 1000, and/or the management server 100, thereby communicating with other devices.

The user may allow the electronic device 1000 to communicate with a personal mobility vehicle, which is desired to be used, through the wired or wireless communication, and based on the communication, the user may occupy and use the personal mobility vehicle.

When the user returns the personal mobility vehicle after the use of the personal mobility vehicle is completed, the user may allow the electronic device 1000 to perform user authentication and payment through the communication with the server 150. When the service provider subscribed to by the user is different from a service provider including a personal mobility vehicle actually used by the user, the server 150 may calculate a service usage fee based on the service of two service providers and transmit the service usage fee to the electronic device 1000, thereby allowing the user to pay the service usage fee.

As is apparent from the above description, it is possible to design a personal mobility vehicle having a simple structure so as to share functions of the personal mobility vehicle with a user's personal electronic device.

Further, it is possible to allow a user who is subscribed to a personal mobility sharing service of one service provider to use a personal mobility sharing service of various service providers.

For example, a user who is subscribed to a personal mobility sharing service of a service provider that provides a personal mobility service in a first region can easily use a personal mobility sharing service of a service provider that provides a personal mobility service in a second region.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a read only memory (ROM), a random access memory (RAM), a magnetic tape, a magnetic disk, a flash memory, and an optical data storage device.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A server comprising:
a communication device;
a memory configured to store information about a plurality of personal mobility vehicles and user information about users; and
a control device electrically connected to the communication device and the memory, wherein the control device is configured to:
receive a first authentication request of a first user of an electronic device from the electronic device through the communication device;
receive an authentication request of a first personal mobility vehicle of the plurality of personal mobility vehicles from the first personal mobility vehicle through the communication device;
authenticate the first authentication request of the first user based on the user information about the users stored in the memory;
authenticate the authentication request of the first personal mobility vehicle based on the information about the plurality of personal mobility vehicles stored in the memory;
transmit unlock information of the first personal mobility vehicle to the first personal mobility vehicle through the communication device based on the authentication of the first authentication request and the authentication of the authentication request of the first personal mobility vehicle; and
transmit information about a service usage fee to the electronic device, the service usage fee being calculated based on use time information and use distance information of the first personal mobility vehicle;
wherein the control device is further configured to:
receive service use request information of the server from the electronic device through the communication device;
authenticate, in response to receiving the service use request information of the server, a second authentication request of the first user based on the user information about the users stored in the memory; and
transmit authentication completion information about the second authentication request of the first user to the electronic device through the communication device.

2. The server of claim 1, wherein the control device is configured to:
receive, from the electronic device through the communication device, information about a selection of the first personal mobility vehicle by the electronic device or information about communication between the electronic device and the first personal mobility vehicle; and authenticate the first authentication request and the authentication request of the first personal mobility vehicle based on the reception of the information about the selection or of the information about the communication.

3. The server of claim 1, wherein the control device is configured to:

transmit authentication completion information about the first authentication request to the electronic device through the communication device;

transmit authentication completion information about the authentication request of the first personal mobility vehicle to the first personal mobility vehicle through the communication device; and transmit unlock information of the first personal mobility vehicle to the first personal mobility vehicle through the communication device based on the transmission of the authentication completion information about the first authentication request and the transmission of the authentication completion information about the authentication request of the first personal mobility vehicle.

4. The server of claim 1, wherein the control device is configured to:

receive use time information and the use distance information of the first personal mobility vehicle from the electronic device through the communication device; and calculate, in response to receiving the use time information and the use distance information, the service usage fee of the first personal mobility vehicle based on a predetermined fee calculation condition corresponding to personal mobility vehicle use times and use distances.

5. The server of claim 4, wherein, based on the information about the first personal mobility vehicle being stored in a first server of a first service provider and the user information about the first user of the electronic device being stored in a second server of a second service provider, the service usage fee comprises a first fee of the first server and a second fee of the second server.

6. A server comprising:
a communication device;
a memory configured to store information about a plurality of personal mobility vehicles and user information about users; and
a control device electrically connected to the communication device and the memory, wherein the control device is configured to:
 receive a first authentication request of a first user of an electronic device from the electronic device through the communication device;
 receive an authentication request of a first personal mobility vehicle of the plurality of personal mobility vehicles from the first personal mobility vehicle through the communication device;
 authenticate the first authentication request of the first user based on the user information about the users stored in the memory;
 authenticate the authentication request of the first personal mobility vehicle based on the information about the plurality of personal mobility vehicles stored in the memory;
 transmit unlock information of the first personal mobility vehicle to the first personal mobility vehicle through the communication device based on the authentication of the first authentication request and the authentication of the authentication request of the first personal mobility vehicle; and
 transmit information about a service usage fee to the electronic device, the service usage fee being calculated based on use time information and use distance information of the first personal mobility vehicle.

7. The server of claim 6, wherein the control device is configured to:

receive, from the electronic device through the communication device, information about a selection of the first personal mobility vehicle by the electronic device or information about communication between the electronic device and the first personal mobility vehicle; and authenticate the first authentication request and the authentication request of the first personal mobility vehicle based on the reception of the information about the selection or of the information about the communication.

8. The server of claim 6, wherein the control device is configured to:

transmit authentication completion information about the first authentication request to the electronic device through the communication device;

transmit authentication completion information about the authentication request of the first personal mobility vehicle to the first personal mobility vehicle through the communication device; and transmit unlock information of the first personal mobility vehicle to the first personal mobility vehicle through the communication device based on the transmission of the authentication completion information about the first authentication request and the transmission of the authentication completion information about the authentication request of the first personal mobility vehicle.

9. The server of claim 6, wherein the control device is configured to:

receive use time information and the use distance information of the first personal mobility vehicle from the electronic device through the communication device; and calculate, in response to receiving the use time information and the use distance information, the service usage fee of the first personal mobility vehicle based on a predetermined fee calculation condition corresponding to personal mobility vehicle use times and use distances.

10. The server of claim 9, wherein, based on the information about the first personal mobility vehicle being stored in a first server of a first service provider and the user information about the first user of the electronic device being stored in a second server of a second service provider, the service usage fee comprises a first fee of the first server and a second fee of the second server.

11. The server of claim 10, wherein the control device is configured to:

receive service information about the first personal mobility vehicle from the first server of the first service provider through the communication device; and transmit the service information about the first personal mobility vehicle to the electronic device through the communication device.

12. The server of claim 11, wherein the control device is configured to convert a communication protocol of the first server into a predetermined standard protocol of the server.

13. A method for providing a personal mobility service of a server, the method comprising:
- receiving a first authentication request of a user of an electronic device from the electronic device;
- receiving an authentication request of a first personal mobility vehicle from the first personal mobility vehicle;
- authenticating the first authentication request of the user based on pre-stored user information about a plurality of users;
- authenticating the authentication request of the first personal mobility vehicle based on pre-stored information about a plurality of personal mobility vehicles;
- transmitting unlock information of the first personal mobility vehicle to the first personal mobility vehicle based on the authentication of the first authentication request and the authentication of the authentication request of the first personal mobility vehicle; and
- transmitting information about a service usage fee to the electronic device, the service usage fee being calculated based on use time information and use distance information of the first personal mobility vehicle.

14. The method of claim 13, further comprising:
- receiving service use request information from the electronic device;
- in response to receiving the service use request information, authenticating a second authentication request of the user based on the pre-stored user information about the plurality of users; and
- transmitting authentication completion information about the second authentication request of the user to the electronic device.

15. The method of claim 13, wherein further comprising:
- receiving, from the electronic device, information about a selection of the first personal mobility vehicle by the electronic device or information about communication between the electronic device and the first personal mobility vehicle; and
- authenticating the first authentication request and the authentication request of the first personal mobility vehicle based on the receiving of the information about the selection or of the information about the communication.

16. The method of claim 13, further comprising:
- transmitting authentication completion information about the first authentication request to the electronic device;
- transmitting authentication completion information about the authentication request of the first personal mobility vehicle to the first personal mobility vehicle; and
- transmitting unlock information of the first personal mobility vehicle to the first personal mobility vehicle based on the transmitting of the authentication completion information about the first authentication request and the transmitting of the authentication completion information about the authentication request of the first personal mobility vehicle.

17. The method of claim 13, further comprising:
- receiving the use time information and the use distance information of the first personal mobility vehicle from the electronic device; and
- calculating, in response to receiving the use time information and the use distance information, the service usage fee of the first personal mobility vehicle based on a predetermined fee calculation condition corresponding to personal mobility vehicle use times and use distances.

18. The method of claim 17, wherein, based on the information about the first personal mobility vehicle being stored in a first server of a first service provider and the user information about the user of the electronic device being stored in a second server of a second service provider, the service usage fee comprises a first fee of the first server and a second fee of the second server.

19. The method of claim 18, further comprising:
- receiving service information about the first personal mobility vehicle from the first server of the first service provider; and
- transmitting the service information about the first personal mobility vehicle to the electronic device.

20. The method of claim 19, further comprising converting a communication protocol of the first server into a predetermined standard protocol of the server.

* * * * *